United States Patent Office 2,716,135
Patented Aug. 23, 1955

2,716,135

CATALYTIC HYDROGENATION OF AROMATIC NITRO COMPOUNDS TO AMINES

Leon O. Winstrom, East Aurora, N. Y., assignor to Allied Chemical & Dye Corporation, New York, N. Y., a corporation of New York No Drawing. Application December 29, 1950, Serial No. 203,561

8 Claims. (Cl. 260—580)

This invention relates to the hydrogenation of aromatic nitro compounds to the corresponding amines, and is particularly concerned with an improved process for the catalytic vapor phase hydrogenation of nitrobenzene to aniline.

The prior art discloses the hydrogenation of nitrobenzene vapors to aniline in the presence of catalysts comprising nickel sulfide supported on inactive alumina, e. g. corundum and "Alundum." However, our experience indicates that such catalysts have comparatively low activity and are generally inadequate for commercial use in the hydrogenation of aromatic nitro compounds to the corresponding amines. Thus, the hydrogenation of nitrobenzene vapors to aniline in the presence of nickel sulfide on granular, crystalline, alpha-alumina (corundum) results in a yield of aniline (crude) of only 43% of theory; similarly, the use of other carriers, such as pumice, "Alundum" and grained aluminum gives low yields of aniline not exceeding about 50% of theory and passes substantial amounts of nitrobenzene. The art further discloses hydrogenation of nitrobenzene to aniline in the present of a catalyst consisting of a mixture of metallic sulfides, such as nickel sulfide and tungsten sulfide, supported on activated alumina, and the vapor phase hydrogenation of nitrobenzene to aniline over a catalyst consisting of copper sulfide supported on an inert carrier including activated alumina. It has also been known to employ nickel sulfide supported on activated alumina in the vapor phase hydrogenation of substances such as diolefins and mineral oils. Activated alumina has also been used as a promoter for nickel sulfide catalysts in the hydrogenation of carbonaceous materials. However, in present commercial practice, aniline is commonly prepared from nitrobenzene using acid and iron as reducing medium.

One object of the invention is to provide improved catalytic processes for hydrogenating aromatic nitro compounds, particularly nitrobenzene, to the corresponding aromatic amines. A particular object of the invention is the provision of improved catalytic procedure for hydrogenating nitrobenzene in the vapor phase to aniline more rapidly and with better yields than by prior art processes. Other objects and advantages will become apparent from the following detailed description of the invention.

To accomplish the foregoing objects and in a broad sense, the invention briefly resides in carrying out the reduction of an aromatic nitro compound, such as nitrobenzene, to the corresponding amine by hydrogenating the aromatic nitro compound in the presence of nickel sulfide associated with amorphous alumina as hereinafter described. The use of the nickel sulfide-alumina type catalysts of the invention greatly increases the rate of reaction and yield of aromatic amine product over that obtained utilizing the ordinary nickel sulfide-alumina catalysts heretofore proposed for this reaction, particularly as regards production of aniline from nitrobenzene. Thus, my catalysts may be as much as 100 times as effective as similar prior art catalysts, particularly those made with inactive alumina, which have been proposed for aiding the hydrogenation of aromatic compounds such as nitrobenzene to the corresponding amines. It was indeed surprising and unobvious that the nickel sulfide-alumina type catalysts of the invention would function with such an outstanding degree of efficiency in the foregoing reaction.

While the process of the invention is applicable for effecting the vapor phase and even liquid phase hydrogenation of aromatic nitro compounds such as nitrotoluenes, nitroxylenes, etc., to the corresponding amines, the herein disclosed process is of particular advantage in effecting the vapor phase hydrogenation of nitrobenzene to aniline. The invention process will accordingly be described especially in relation to the latter reaction, although it is to be understood it is not limited thereto.

The amorphous alumina which is mixed with the nickel sulfide constitutes an essential element of the catalyst compositions employed in the invention process. Accordingly, such amorphous alumina does not function merely as a carrier or inert material in the catalyst composition, but acts as a promoter for the nickel sulfide. Hence, the combination of the nickel sulfide and amorphous alumina in the catalyst compositions employed in my process, acts synergistically to facilitate the aforementioned reaction to a degree far above the additive individual effects of the nickel sulfide, and the amorphous alumina on the reaction.

Catalysts hereof comprising amorphous alumina in combination with nickel sulfide may be prepared by suitable known methods. One form includes the so-called "precipitated" type catalysts obtained by forming a mixture of gelatinous precipitates of nickel and aluminum hydroxides and/or carbonates, and heating and sulfiding such mixture in a manner described more fully below.

In the "precipitated" catalysts mentioned above, the alumina is apparently present essentially entirely in amorphous form. On the other hand, ordinary aluminas are of essentially crystalline structure and do not possess the physical characteristics and catalytic activity of the amorphous aluminas of the invention catalysts. The expression "amorphous alumina" as employed herein is intended to denote aluminas which are substantially completely in amorphous form, as in the case of the above "precipitated" catalysts suitable in the invention process.

Further, the nickel sulfide-alumina type catalysts employed in the invention process are believed to contain the sulfur and nickel mainly in the form of a mixture of sulfides, and apparently do not lose substantial amounts of sulfur during use and/or reactivation, whereas the prior art catalysts employed in hydrogenating nitrobenzene to aniline, obtained by sulfiding nickel oxide supported on inactive alumina in the form of corundum or "Alundum," and apparently containing only one nickel sulfide, i. e. NiS, tend to lose all of their sulfur content and are markedly less active than the catalysts of the invention.

It is accordingly believed that the relatively high activity of the nickel sulfide-alumina type catalyst utilized in the invention process for the hydrogenation of nitro aromatics to the corresponding amines, e. g. aniline, is due to their content of amorphous alumina and/or multiple nickel sulfides, wherein the nickel is present in various valences. However, the invention is not to be taken as limited by any theory as to the reason for, or the manner in which, the catalysts hereof successfully function.

The amorphous alumina is effective in amounts varying over a wide range as promoter for the nickel sulfide in the hydrogenation of nitrobenzene to aniline in accordance with the invention. Thus, this promoting action may be realized even if such alumina is present in amount as low as 2% by weight of the catalyst mixture of alumina and nickel sulfide. However, the promoting effect may be generally increased by raising the proportion of alumina in the catalyst. It is preferable to employ the alumina promoters of the invention in an amount of at least 10% by weight of the nickel sulfide-alumina catalyst, and for best results, particularly in the case of the "precipitated" amorphous alumina type catalysts hereof, from about 10% to about 90% of the alumina by weight of the catalyst composition should be present.

The hydrogenation of nitrobenzene vapors to aniline with the aid of the catalysts of the invention may be carried out at varying temperatures, but is preferably effected at temperatures between 250 and 350° C. It should be recognized however, that the temperature throughout a bed of the invention catalysts during the hydrogenation reaction may vary, and in normal operation of the invention process, peak temperatures, i. e. temperature of zone of maximum reaction, within such a catalyst bed may be as high as 400-450° C. The nitrobenzene vapors are generally mixed with hydrogen or a mixture which contains hydrogen and a substantially inert gas for example crude hydrogen which contains substantial amounts of carbon monoxide and is obtainable from cracking hydrocarbons. Preferably the hydrogen is employed in amounts of about 1½ to 5 times the amount theoretically required for the reduction, corresponding to about 4½ to 15 mols of hydrogen per mol of nitrobenzene.

The nickel sulfide amorphous alumina catalysts of the type employed herein require no addition of $H_2S$ or other sulfiding agent during the hydrogenation of nitrobenzene to aniline in accordance with the invention to maintain their activity, and are generally characterized by high activity and long life when used in this reaction. Further, their activity, when lost, may be restored substantially completely and repeatedly by removing accumulated organic material therefrom by oxidation with oxygen or air preferably at between 300 and 500° C., followed by reduction with hydrogen preferably within the same temperature range. Such regeneration procedure is described and claimed in copending U. S. application Serial No. 203,562 of L. O. Winstrom and W. B. Harris, filed of even date herewith, now U. S. P. 2,671,763.

The catalysts obtained by coprecipitating a mixture of nickel and aluminum hydroxides and/or carbonates, or by commingling separately prepared gels (gelatinous precipitates) of these compounds, followed by heating and sulfiding such coprecipitates or gels, are particularly valuable for promoting hydrogenation of nitrobenzene vapors to aniline.

A suitable coprecipitate may be obtained by treating an aqueous solution containing a mixture of water-soluble aluminum and nickel salts, e. g. of hydrochloric, sulfuric, nitric, formic, acetic, etc. acids, with a suitable alkaline agent, e. g. ammonium and alkali metal hydroxides and carbonates. Another procedure involves adding a nickel salt, e. g. nickel nitrate, to aqueous sodium aluminate. The coprecipitate secured by the above procedures is preferably washed and dried, and the dried product converted to suitable size and shape, followed by heating and sulfiding to produce the catalyst.

The "green" catalyst, obtained by coprecipitating or commingling gels of aluminum and nickel hydroxides and/or carbonates, may be transformed to the sulfide catalyst, for example, by heating not above 800° C., preferably not above about 500° C., to decompose the said hydroxides and/or carbonates to the metal oxides, and treating the latter, with or without preliminary reduction with hydrogen in known manner to form metallic nickel, with a sulfiding agent, e. g. hydrogen sulfide, preferably between about 300° C. and 500° C. to form nickel sulfide. A similar suitable catalyst may be obtained by heating the coprecipitated or commingled gels directly in an atmosphere of hydrogen sulfide or other sulfiding agent.

In a preferred embodiment of the invention for securing a nickel sulfide-alumina type catalyst of unusual value for the purposes of the invention, the gel formed by coprecipitating nickel and aluminum hydroxides and/or carbonates, or by separately precipitating and commingling such hydroxides and/or carbonates in the manner noted above, is heated, say at about 90-100° C., in the presence of water. This procedure yields a material which, according to X-ray analysis, comprises a substantial proportion of a hydrated nickel aluminate such as $Ni_2Al_2O_5 \cdot xH_2O$ (see Comptes Rendus, vol. 226 (1948) pages 579-580). When such a nickel aluminate is sulfided, e. g. at elevated temperatures with $H_2S$, a catalyst comprising a mixture of nickel sulfides and amorphous alumina, in accordance with the invention, is formed, which catalyst is distinguished by excellent activity and selectivity combined with exceptional longevity in the hydrogenation of nitrobenzene to aniline.

It is to be understood that the instant preferred embodiment is intended to include nickel sulfide-amorphous alumina catalysts obtained by sulfiding a material comprising essentially a hydrated nickel aluminate prepared in any suitable manner. While the basis of the superiority of the catalyst derived from hydrated nickel aluminate is not known, it is believed that the improved result is due to a superior lattice spacing of nickel and aluminum atoms in the catalyst.

The above described "precipitated" catalysts, particularly those derived from a hydrated nickel aluminate, containing nickel sulfide intimately mixed with amorphous alumina, are much more highly active for catalyzing the hydrogenation of nitrobenzene to aniline than catalysts prepared by coating nickel sulfide on a carrier of ordinary alpha alumina (e. g. corundum, "Alundum"), pumice, etc. In addition, they posess longer catalyst life and greater activity (permit a faster rate of hydrogenation of nitrobenzene to aniline and catalyze the hydrogenation reaction more vigorously at lower temperatures) in the said hydrogenation reaction than activated alumina-supported nickel sulfide catalysts.

The following examples illustrate the "precipitated" nickel sulfide-alumina type catalyst of the invention, the quantities therein being expressed in parts by weight:

*Example 1.*—A filtered solution of 665 parts of ammonium carbonate, $(NH_4)_2CO_3H_2O$, in 3850 parts of distilled water at 10° C. was added gradually with rapid agitation to a filtered solution at 5° C., prepared by mixing a solution of 291 parts of nickel nitrate, $$Ni(NO_3)_2.6H_2O$$

in 300 parts of distilled water with a solution of 750 parts of aluminum nitrate, $Al(NO_3)_3.9H_2O$, in 700 parts of distilled water. The slurry thus obtained was stirred for ½ hour and filtered. The filter cake was washed three times by resludging it each time in 4000 parts of distilled water and filtering. The resulting cake was extruded through a 7 mm. diameter hole and dried at about 100° C. The dried product was crushed and screened to 6-10 mesh size pieces.

56 parts of this material (about 100 parts by volume) were charged to a Downs type converter, heated to 300° C. and sulfided by introducing hydrogen sulfide for about ¾ hour at an hourly rate of ½ liter/gram (NTP). Thereafter the catalyst was heated to 330° C. in ⅓ hour, after which half of the hydrogen sulfide flow was replaced by hydrogen and the temperature was raised to 345° C. in ½ hour and held at this temperature for ¼ hour. The flow of hydrogen sulfide was stopped and the converter was cooled to 300° C. The catalyst was then ready to catalyze the hydrogenation of nitrobenzene to aniline.

Nitrobenzene vapors admixed with 3 times the amount of hydrogen required by theory to form aniline were passed through the catalyst bed prepared above with the bath temperature at 300° C. and at an hourly rate of about 300 grams of nitrobenzene per liter of catalyst. The yield of aniline thus obtained was over 99% of theory. The "coprecipitated" type catalyst was operated 700 hours under the foregoing conditions before it "died," i. e. began to pass substantial amounts of unattacked nitrobenzene under the above conditions.

*Example 2.*—A filtered solution of 430 parts of ammonium carbonate ((NH$_4$)$_2$CO$_3$.H$_2$O) in 2550 parts of distilled water at 5° C. was added gradually with rapid agitation to a filtered solution at 5° C., prepared by mixing a solution of 291 parts of nickel nitrate

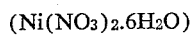

in 300 parts of distilled water with a solution of 375 parts of aluminum nitrate (Al(NO$_3$)$_3$.9H$_2$O) in 350 parts of distilled water. The slurry thus obtained was filtered, and the filter cake was washed three times by resludging it each time with 4 times its volume of distilled water and filtering. The washed cake was resludged with 4 times its volume of distilled water, and the aqueous mixture was heated to 100° C. for about 18 hours, and filtered. The cake was dried in an atmospheric oven and crushed to size, yielding a total of 190 parts of product comprising 63 parts of 6–8 mesh size, 29 parts of 8–10 mesh size and 51 parts of 10–100 mesh size.

79 parts of "green" catalyst thus obtained (64 parts of 6–8 mesh size and 15 parts of 8–10 mesh size) were placed in an igniter and heated in a stream of air first to 300° C. in 1 hour, then to 450° C. in 2 additional hours and held at 450° C. for 1 additional hour. The catalyst was then cooled to room temperature and sulfided by heating in a stream of hydrogen sulfide, first to 300° C. in one hour and then to 450° C. in one hour, maintaining the catalyst at 450° C. for 1 hour, and then cooling to room temperature. About 60 parts of catalyst were thus obtained and stored in an atmosphere of carbon dioxide prior to use.

This catalyst was charged to a Downs type converter (see for example U. S. P. 1,604,739). Technical nitrobenzene vapors admixed with about 3 times the amount of hydrogen required by theory to form aniline were passed through the catalyst bed prepared above with the bath temperature at 300° C. and at an hourly rate of about 300 grams of nitrobenzene per liter of catalyst. The yield of aniline thus obtained was almost quantitative. The catalyst was operated 1600 hours under the foregoing conditions without showing any substantial decline in activity.

The nickel sulfide-amorphous alumina catalysts employed in the invention process may be utilized in admixture with other suitable materials which may be catalytic or non-catalytic under the reaction conditions. Thus, the catalyst compositions of the invention, in the form of pellets, granules or other shapes, may contain binders, stabilizers, activators or other components. Further, such catalyst compositions may be used on supporting material or carriers such as silica or various clays, particularly where the amorphous alumina of the invention catalysts does not function itself as a carrier. Thus, for example, a suitable "precipitated" type catalyst may be prepared by forming the coprecipitate of nickel and of aluminum hydroxides in or on a suitable carrier, e. g. activated alumina, corundum, charcoal, etc., followed by sulfiding the mass as described above. In use, the catalyst compositions of the invention may be employed in the form of fixed catalyst beds or fluidized catalyst masses in a manner known in the art.

The "precipitated" nickel sulfide-amorphous alumina catalysts described above, including those catalysts obtained by sulfiding a hydrated nickel aluminate, may contain small amounts of other metal sulfides in addition to nickel sulfide, e. g. copper sulfide, without deleteriously affecting the life or activity of such catalysts in operation.

The catalysts used in accordance with the invention are more or less pyrophoric, and are hence desirably kept and stored in a non-oxidizing atmosphere or medium e. g. CO$_2$, H$_2$, N$_2$, H$_2$S or under liquid aniline saturated with H$_2$S or water saturated with H$_2$S.

From all of the foregoing, it is apparent that the nickel sulfide amorphous alumina catalysts of the invention are much more powerful stimulants for the vapor phase hydrogenation of nitrobenzene to aniline than catalysts prepared by combining nickel sulfide with inactive alumina, e. g. corundum or "Alundum." The major advantages of the invention process for hydrogenating aromatic nitro compounds, particularly nitrobenzene to aniline are (a) great increase in rate of reaction; (b) ability to carry out the reaction at lower temperatures and more vigorously than heretofore possible by prior art procedures; (c) increase in yield of product; (d) longer catalyst life; and (e) ease of regeneration of the catalyst and ability to regenerate it repeatedly without discarding it, advantages (d) and (e) thus affording economies in catalyst cost and maintenance.

Since various changes and modifications may be made in the invention without departing from the spirit thereof, the invention is to be taken as limited only by the scope of the appended claims.

I claim:

1. The process of manufacturing a mononuclear aromatic primary amine by the vapor-phase catalytic reduction of the corresponding mononuclear aromatic nitro hydrocarbon with hydrogen, which comprises contacting a mixture of vapor of said mononuclear aromatic nitro hydrocarbon and at least 4½ mols of hydrogen per mol of nitro hydrocarbon, at a temperature of 250° to 450° C., with a catalyst essentially comprising an intimate mixture of nickel sulfide and amorphous alumina, the amount of alumina being about 10% to about 90% of the weight of the nickel sulfide-alumina catalyst, said catalyst having been obtained, by a procedure including a sulfiding treatment, from a mixture of precipitates of insoluble nickel and aluminum compounds selected from the group consisting of nickel and aluminum hydroxides and carbonates produced from water-soluble nickel and aluminum salts by alkaline precipitation.

2. The process of manufacturing a mononuclear aromatic primary amine defined in claim 1, wherein the mixture of precipitates of insoluble compounds has been produced by reacting water-soluble nickel and aluminum salts in aqueous solution with an alkaline reagent selected from the group consisting of ammonium and alkali metal hydroxides and carbonates.

3. The process of manufacturing a mononuclear aromatic primary amine defined in claim 1, wherein the mixture of precipitates of insoluble compounds has been heated in the presence of water to obtain a substantial proportion of hydrated nickel aluminate, prior to the sulfiding treatment.

4. The process of manufacturng aniline by the vapor-phase catalytic reduction of nitrobenzene with hydrogen, which comprises passing a mixture of nitrobenzene vapor and at least 4½ mols of hydrogen per mol of nitrobenzene, at a temperature of 250 C. to 450° C., in contact with a catalyst essentially comprising an intimate mixture of nickel sulfide and amorphous alumina, the amount of alumina being about 10% to about 90% of the weight of the nickel sulfide-alumina catalyst, said catalyst having been obtained, by a procedure including a sulfiding treatment, from a mixture of insoluble nickel and aluminum compounds selected from the group consisting of nickel and aluminum hydroxides and carbonates, in the form of precipitates produced by the reaction of an alkaline reagent selected from the group consisting of ammonium and alkali metal hydroxides and carbonates with water-soluble salts of nickel and aluminum in aqueous solution.

5. The process of manufacturing aniline defined in claim 4, wherein the catalyst has been obtained by a procedure which includes heating the mixture of precipitates of insoluble nickel and aluminum compounds to a temperature not exceeding 800° C., prior to the sulfiding treatment.

6. The process of manufacturing aniline defined in claim 4, wherein the catalyst has been obtained from a coprecipitate produced by reacting ammonium carbonate with an aqueous solution of water-soluble nickel and aluminum salts.

7. The process of manufacturing aniline defined in claim 4, wherein the catalyst has been obtained from a coprecipitate produced by reacting ammonium carbonate with an aqueous solution of water-soluble nickel and aluminum salts, followed by heating the coprecipitate to a temperature of about 90° to 100° C. in the presence of water for a period sufficient to produce a substantial proportion of hydrated nickel aluminate.

8. The process of manufacturing aniline defined in claim 7, wherein the catalyst has been obtained by a procedure which includes heating the product resulting from the hydration treatment to a temperature not exceeding 500° C., prior to the sulfiding treatment.

References Cited in the file of this patent

UNITED STATES PATENTS

| Number | Name | Date |
| --- | --- | --- |
| 2,039,259 | Pier et al. | Apr. 28, 1936 |
| 2,402,440 | Owen | June 18, 1946 |
| 2,402,626 | Howk | June 25, 1946 |
| 2,430,421 | Gage | Nov. 4, 1947 |
| 2,435,380 | Archibald et al. | Feb. 3, 1948 |
| 2,455,713 | Voorheis | Dec. 7, 1948 |